June 25, 1968  R. C. CARTER  3,390,343
SINGLE SIDE-BAND PULSE PRODUCT DETECTOR
Filed May 24, 1965  2 Sheets-Sheet 1
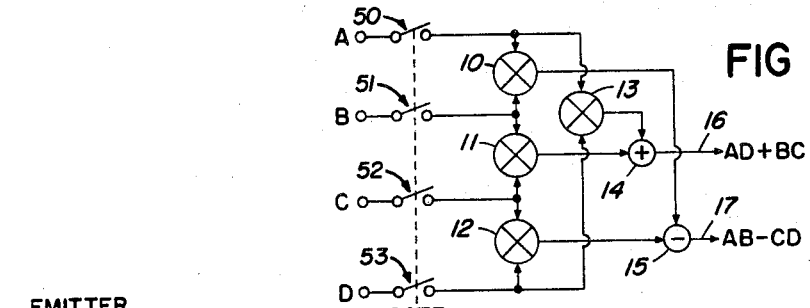
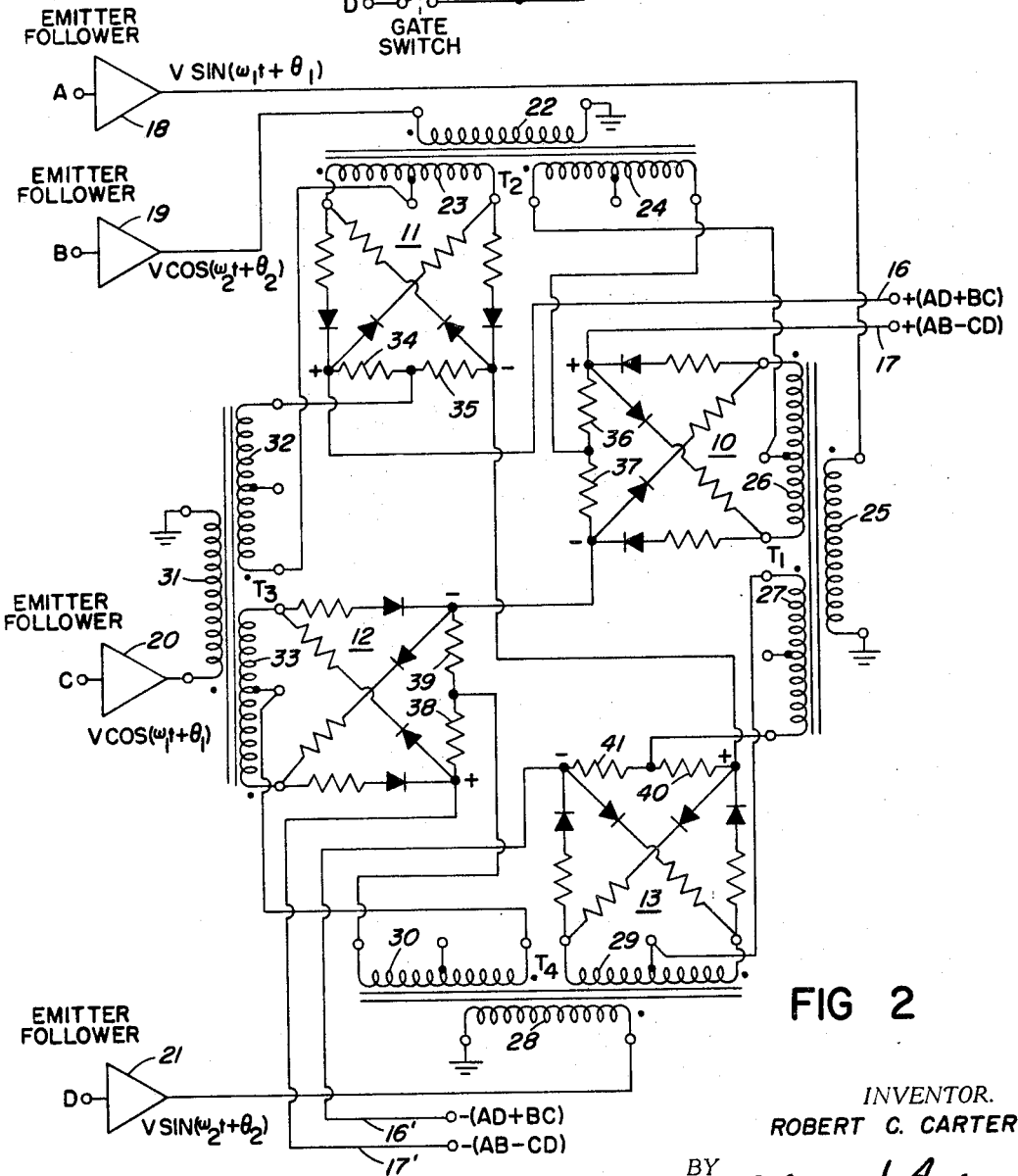
INVENTOR.
ROBERT C. CARTER
BY Moody & Anderson
AGENTS United States Patent Office 3,390,343
Patented June 25, 1968

3,390,343
SINGLE SIDE-BAND PULSE PRODUCT DETECTOR
Robert C. Carter, Richardson, Tex., assignor to Collins Radio Company, Cedar Rapids, Iowa, a corporation of Iowa
Filed May 24, 1965, Ser. No. 458,159
2 Claims. (Cl. 329—146)

ABSTRACT OF THE DISCLOSURE

A combination of product detectors together with sum and difference circuitries which may be used to add or subtract two frequencies, to single sideband modulate, or to determine the phase angle between sinusoidal input waveforms. The input signal may be of different frequencies or of the same frequency or may be in the form of D.C. levels. The latter inputs are gated into the circuitry as repetitive samples of the level of the input. First and second output signals are obtained, the amplitudes of which are respectively proportional to the sine and cosine functions of the phase difference angle.

This invention relates generally to signal detection and more specifically to a versatile signal processing system providing product detection and capable of operating on a pulse basis.

Generally, the circuitry of the present invention receives four input signals and yields a pair of outputs in the form of the sum and difference respectively of particular cross-products of the input signals. The cross-products are so effected, and the addition and subtraction operations are so related, that the form of the outputs provides an unusual degree of signal processing utility. The present invention finds an especial usage in its ability to operate on a pulse basis in performing particular operations on pulsed inputs to provide pulsed outputs the magnitudes of which follow particular useful relationships.

The invention is featured in the provision of a combination of product detectors and signal phasing means which may be used to add or subtract two frequencies, to single sideband modulate, or to determine the phase angle between sinusoidal input waveforms. The input signals may be of different frequencies or of the same frequency, or may be in the form of D.C. levels. The inputs may be continuous signals or pulsed samples of an input signal level.

The manner in which the present invention provides a useful operational tool as concerns signal processing will become apparent upon reading the following description in accordance with the accompanying drawings in which:

FIGURE 1 is a functional block diagram of the basic form of the invention;

FIGURE 2 is a schematic diagram of an embodiment of the system of FIGURE 1;

Figure 3:
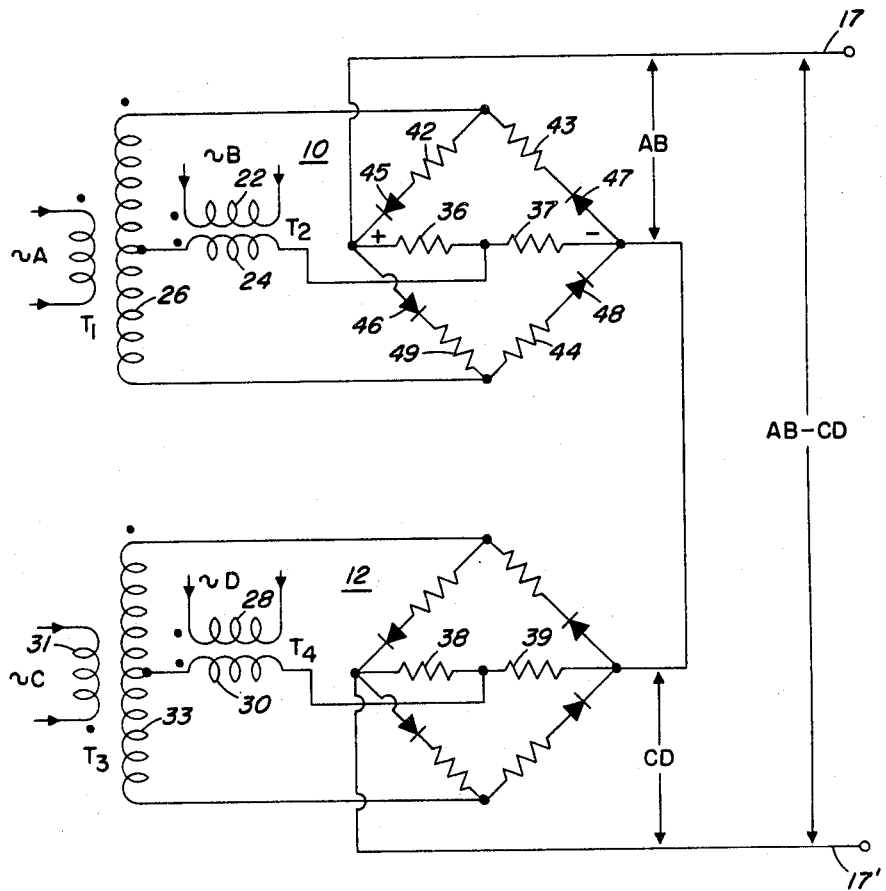
FIGURE 3 is a partial schematic diagram of a portion of the system of FIGURE 2.

Referring to FIGURE 1, the circuitry is seen to be comprised of a network of four product detectors 10, 11, 12, and 13 in conjunction with an adding network or function 14 and a subtracting network or function 15. Four input signals A, B, C and D are applied to the network, and from the network two outputs 16 and 17 are obtained. As will be further described, the inputs may be applied through gating switches if the inputs are direct currents and the product detectors employ transformer signal combining means. The output 16 is in the form of $AD+BC$. The output 17 is in the form of $AB-CD$.

The inputs A and B are applied to a mixer or product detector 10 the output of which is supplied as a first input to the subtractive network 15. The inputs C and D are applied as inputs to mixer or product detector 12 the output of which is applied as a second input to the subtractive network 15. Detector 10 develops an output proportional to the product of A and B; detector 12 develops an output proportional to the product of C and D. The products AB and CD are subtracted in network 15 to provide the output 17 in the form of $AB-CD$.

The second output 16 is seen to be developed from additive network 14 which receives inputs from product detectors 13 and 11. Inputs A and D are multiplied by detector 13 while inputs B and C are multiplied by detector 11. The output from the additive network 14 thus is in the form of $AD+BC$.

For the purpose of explaining the significance of the network of FIGURE 1, the outputs 16 and 17 are seen to be expressed as follows:

$$E = AB - CD \qquad (1)$$
$$F = AD + BC \qquad (2)$$

Electronically, the two algebraic expressions 1 and 2 are very useful and may, for instance, be used to add or subtract two frequencies, to single sideband modulate, and to determine phase angles between sinusoidal waveforms.

For example, assume input signals A, B, C, and D to be functions of time such that:

$$A = V \sin(\omega_1 t + \theta_1)$$
$$B = V \cos(\omega_2 t + \theta_2)$$
$$C = V \cos(\omega_1 t + \theta_1)$$
$$D = V \sin(\omega_2 t + \theta_2) \qquad (3)$$

$AB - CD$ then yields a trigonometric identity:

$$V^2[\sin(\omega_1 t+\theta_1)\cos(\omega_2 t+\theta_2) - \cos(\omega_1 t+\theta_1)\sin(\omega_2 t+\theta_2)] = V^2 \sin[(\omega_1-\omega_2)t+\theta_1-\theta_2] = E \qquad (4)$$

Also $AD+BC$ yields another identity:

$$V^2[\sin(\omega_1 t+\theta_1)\sin(\omega_2 t+\theta_2) + \cos(\omega_1 t+\theta_1)\cos(\omega_2 t+\theta_2)] = V^2 \cos[(\omega_1-\omega_2)t+\theta_1-\theta_2] = F \qquad (5)$$

If one considers the inputs A and C to be interchanged, the sum components may be obtained as outputs as follows:

$$E = V^2 \cos[(\omega_1+\omega_2)t+\theta_1+\theta_2]$$
$$F = V^2 \sin[(\omega_1+\omega_2)t+\theta_1+\theta_2]$$

It is thus seen that from sinusoidal quadrature inputs at frequencies $\omega_1$ and $\omega_2$, the circuitry provides quadrature outputs at the sum or difference frequencies.

If in expressions 3, 4, and 5, we consider $\omega_1$ to equal $\omega_2$, the outputs may be expressed as follows:

$$E = V^2 \sin(\theta_1-\theta_2)$$
$$F = V^2 \cos(\theta_1-\theta_2) \qquad (6)$$

Examination of expressions 6 shows that the outputs are a pair of direct current voltages proportional to the sine and cosine respectively of the difference in the phase of the input signals, and it is particularly to be noted that in the situation where $\omega_1$ and $\omega_2$ are equal, it matters not what the frequency of the input is. Thus, even direct current is as good a "frequency" as any other. An examination of the expressions 3, 4, and 5 shows that setting $\omega_1=\omega_2=0$ still obtains expression 6 as outputs.

In a particular embodiment of the circuit to be described, transformers are used in conjunction with the modulator product detectors 10, 11, 12, and 13. Physical circuits employing transformers would operate only to the lowest frequency at which the transformers were operable. However, in the event inputs were according to expression 3 with the situation where $\omega_1$ and $\omega_2$ were both equal to zero (the direct current input situation) an embodiment employing transformers may still be employed by including sampling technique as regards the inputs. The inputs A, B, C, and D may be gated on for a period which is short compared to the reciprocal of the cut-off frequency of the transformers employed. The outputs 16 and 17 will then be in the form of pulses the magnitudes of which follow the relationships of expressions 6. This situation is depicted functionally in FIGURE 1 by the inclusion of a gating switch function including switch controls 50–53 by means of which the inputs A, B, C and D may be applied in pulsed or sampled form.

A physical embodiment of the invention employing transformers in conjunction with the modulator product detectors is depicted in FIGURE 2. The inputs to the embodiment of FIGURE 1 are depicted as sinusoidal frequencies and thus the gating or sampling prior to application to the transformer primary windings, as would be the case with D.C. input signal, is not illustrated in the FIGURE 2 embodiment. Inputs A, B, C and D are applied through emitter-followers 18–21 as respective inputs to first primary windings of four transformers $T_1$, $T_2$, $T_3$ and $T_4$. The modulator product detectors 10, 11, 12, and 13 are of identical structure and as depicted in FIGURE 2, comprise diode bridge arrangements which provide a combination modulating and detecting operation so as to provide outputs proportional to the product of the input signals applied thereto.

Considering for example, modulator product detector 10, the input signal A is applied through secondary winding 26 of transformer $T_1$. Associated with secondary winding 26 is a network of diodes and resistors including a pair of serially connected resistors 36 and 37 across which the output from product detector 10 is developed. The input signal B is applied to product detector 10 in the form of voltage induced in secondary winding 24 of transformer $T_2$. Signal B is thus seen to be applied between the junction of output resistors 36 and 37 and the center-tap of secondary winding 26 of transformer $T_1$. The windings of the transformers are shown with phasing indications such that the output from detector 10, as developed across serially connected resistors 36 and 37, might be polarized as indicated on FIGURE 2.

Product detectors 11, 12, and 13 are of similar structure. Product detector 11 receives input signal B through secondary winding 23 of transformer $T_2$ and input signal C through secondary winding 32 of transformer $T_3$. Detector 12 receives input signal C through secondary winding 33 of transformer $T_3$ and input signal D through secondary winding 30 of transformer $T_4$. Detector 13 receives input signal D through secondary winding 29 of transformer $T_4$ and input signal A through secondary winding 27 of transformer $T_1$. With the relative transformer winding phasings as indicated in FIGURE 2, detector 11 provides an output across resistors 34 and 35 polarized as indicated, detector 12 develops an output across resistors 38 and 39 polarized as indicated, and detector 13 provides an output across resistors 40 and 41 polarized as indicated.

The output 16 is the signal developed between terminals 16 and 16' in FIGURE 2. The output 16 is in the form of the sum of AD and BC. The signal path between terminals 16 and 16' is seen to be through resistor 34 and resistor 35 of detector 11 and then through resistors 40 and 41 of detector 13 to terminal 16'. The relative polarities of the signals developed across the output resistors of detectors 11 and 13 are seen to be additive in nature.

The output signal 17 is developed between terminals 17 and 17' and is in the form of $AB-CD$. The signal path for output 17 is seen to run from terminal 17 through resistors 37 and 36 of detector 10 and then through resistors 39 and 38 of detector 12 to terminal 17'.

FIGURE 3 illustrates that portion of the embodiment of FIGURE 2 employed in the development of output 17. The modulator product detectors 10 and 12 in FIGURE 3 are redrawn in a familiar ring or bridge form. Each of the ring configurations is seen to be comprised of four diodes serially arranged with like polarization around the ring. Each diode is in series with a resistor and forms a leg of the bridge-like arrangement. Input signal A is seen to be applied to detector 10 through transformer $T_1$ across a first diagonal of the bridge arrangement. Output resistors 36 and 37 are serially connected across the other diagonal of the bridge arrangement. The input signal B is imparted through transformer $T_2$ between the center-tap of the secondary winding 26 of transformer $T_1$ and the junction between output resistors 36 and 37.

Modulator product detector 12 is similarly redrawn in ring fashion in FIGURE 3 and is like detector 10 in every respect.

In operation, the diodes in each ring configuration are biased algebraically as functions of the two input signals being applied thereto. The output developed across the resistive network is proportional to the product of the input signals applied to the networks. The output from the two detectors in FIGURE 3 are seen to be serially interconnected in appropriate fashion to arrive at the subtractive function depicted by network 15 of FIGURE 1.

The present invention is especially versatile in its ability to operate on a pulse basis. The input signal may be gated to the network as samples of input signal functions. Since the circuit may operate with input signals of zero frequency or of direct current nature, the circuitry as depicted in FIGURE 2 has been employed as an output pulse product detector in conjunction with a predicted wave, phase pulsed data transmission system demultiplexing and detection arrangement as described in copending application, Ser. No. 458,158 (now patent No. 3,368,036) entitled "Demultiplexing and Detecting System for Predicted Wave Phase-Pulsed Data Transmission System," by Robert C. Carter, Paul M. Cunningham, and Robert D. Tollefson, assignors to the assignee of the preesnt invention.

In the above referenced copending application, synchronous integrating means develop four output signals in the form of D.C. voltages. A first pair of outputs are D.C. voltages proportional to the sine and cosine functions respectively of the phase angle of a given transmission interval, and a second pair of outputs are D.C. voltage proportional respectively to the sine and cosine functions of the phase angle of a succeeding transmission interval. Sampling means are provided by means of which these four D.C. levels are presented as inputs to a pulse product detector in accordance with the present invention as pulse samples. The pulse product detector develops a pair of outputs in the form of pulses the respective magnitudes of which are proportional to the sine and cosine functions of the difference in phase between successive transmission intervals in the system.

Although the particular embodiment of the invention as described herein employs transformer techniques, it is to be understood that in its basic form the present invention is not limited thereto, it being contemplated that other forms of product detectors which do not incorporate transformers may be utilized in which case, the limitation of the operational frequency being limited by the cut-off frequency of the transformers, would be removed.

The ability of the detecting circuitry of the present invention to operate on a pulse basis enables the use of the transformer techniques in conjunction with a gating or sampling technique as concerns the input signal. In this situation, the circuitry performs product detection on a pulse basis and provides an instantaneous product at the output readily adaptable to serial read-out. The pulse method of detection as described herein, permits a read-out of a plurality of D.C. input signal sources in serial form rather than in parallel.

Although the invention has been described with respect

I claim:
1. Signal processing means comprising four input terminals, a first pair of which respectively receive first and second ones of a first pair of input signal, respectively defined as sin $(\omega_1 t + \theta_1)$ and cos $(\omega_1 t + \theta_1)$, a second pair of input terminals respectively receiving first and second ones of a second pair of the input signals respectively defined as sin $(\omega_2 t + \theta_2)$ and cos $(\omega_2 t + \theta_2)$, a first modulator product detector receiving and multiplying the first ones of said first and second pair of input signals, a second modulator product detector receiving and multiplying the second ones of said first and second ones of said first and second pairs of input signals, a third modulator product detector receiving and multiplying the first one of said first pair of said input signals with the second one of said second pair of input signals, a fourth modulator product detector receiving and multiplying the second one of said first pair of signals and the first one of said second pair of input signals, each of said modulator product detectors comprising a first signal transforming means the primary winding of which receives one of said gated input signals, a secondary winding including a winding center-tap; a second signal transformer the primary winding of which receives the other one of said input signals and a secondary winding one end of which is connected to the center tap of the secondary of said first transformer; signal bridge means comprising first, second, third and fourth arms each of which comprises a resistor and a unilateral conduction device serially connected, each of said bridge arms being serially interconnected, said unilateral conduction devices being like-polarized in said series interconnection, the ends of the secondary winding of said first transformer being connected to a first diagonal of the said bridge, voltage dividing means including a center-tap connected to the second diagonal of said bridge, the other end of the secondary winding of said second transformer being connected to the center tap of said voltage dividing means, and an output from said modulator product detector being taken as the voltage developed across said voltage dividing means, signal transformers, means adding the outputs from said first and second modulator product detectors to develop therefrom a first output signal, and means subtracting the output from said third and fourth modulator product detectors to develop therefrom a second output signal.

2. Signal processing means as defined in claim 1 wherein said first output signal is developed as the algebraic summation of like polarized voltages developed across the voltage dividers associated with first and second ones of said modulated product detectors, and said second output signal being taken as the algebraic summation of unlike polarized voltages developed across the voltage dividers associated with third and fourth ones of said modulator product detectors.

References Cited

UNITED STATES PATENTS

| | | | |
|---|---|---|---|
| 2,661,458 | 12/1953 | Saraga | 332—45 X |
| 2,961,610 | 11/1960 | Hosenthien | 332—47 X |
| 3,054,053 | 12/1962 | Cook | 329—112 X |
| 3,155,824 | 11/1964 | Rotier | 329—146 X |
| 3,253,223 | 5/1966 | Kettel | 332—43 X |
| 3,328,694 | 6/1967 | Brady et al. | 332—43 X |

ALFRED L. BRODY, *Primary Examiner.*

ROY LAKE, *Examiner.*